United States Patent [19]

Owens

[11] 4,221,108

[45] Sep. 9, 1980

[54] LAWNMOWER SAFETY CONTROL SYSTEM

[76] Inventor: Boyd L. Owens, P.O. Box 142, Cartersville, Okla. 74934

[21] Appl. No.: 42,672

[22] Filed: May 25, 1979

[51] Int. Cl.³ .................. A01D 69/10; A01D 75/18; F16D 66/02

[52] U.S. Cl. .................................. 56/11.3; 56/10.5; 188/1 A; 192/17 R

[58] Field of Search .................... 188/1 A, 75, 76; 192/17 R, 17 A, 17 C; 56/10.5, 11.3

[56] References Cited

U.S. PATENT DOCUMENTS

| 3,026,665 | 3/1962 | Hoff | 192/17 R |
|---|---|---|---|
| 3,228,177 | 1/1966 | Coaties | 56/10.5 |
| 3,253,391 | 5/1966 | Meldahl | 56/11.3 |
| 3,955,653 | 5/1976 | Comer | 46/10.5 |
| 4,035,994 | 7/1977 | Hoff | 56/11.3 |
| 4,044,533 | 8/1977 | Wick | 56/11.3 |
| 4,122,652 | 10/1978 | Holtermann | 56/11.3 |

FOREIGN PATENT DOCUMENTS 2804799 3/1979 Fed. Rep. of Germany ............ 56/11.3

*Primary Examiner*—Paul J. Hirsch
*Attorney, Agent, or Firm*—Dowell & Dowell

[57] ABSTRACT

A control system for a rotary type lawnmower having a cutter blade housing supporting an engine and having a handle extending upwardly for manipulation by an operator, the control system including a clutch between the motor shaft and the blade, the clutch being of the centrifugal type and having an external drum surface, a brake caliper assembly having two legs pivoted together near their centers and supported at the pivot by the housing, the inner portions of the legs clamping as a brake on said external drum surface and the outer portions of the legs supporting a spring operative in a direction to urge the inner legs to clamp toward each other, and a manual control including linkages coupled to the throttle and to the outer legs and operative when the control is manually actuated to advance the throttle and unclamp the brake, and when released to return the engine to idle and clamp the brake, contacts being provided on the legs to short-circuit the engine ignition when the brakes become excessively worn.

6 Claims, 5 Drawing Figures

LAWNMOWER SAFETY CONTROL SYSTEM

FIELD OF INVENTION

This invention relates to safety control systems for rotary lawnmowers, and more particularly relates to control systems of the type wherein the operator must manually maintain a control member in an operative position to make the lawnmower operate, and wherein upon release of the control member the mower engine automatically returns to idle and the cutter blade is stopped from rotating.

BACKGROUND AND PRIOR ART

The rotary lawnmower has long been recognized as a hazard to persons who operate it because of the heavy cutter blade which rotates at a relatively high speed, even if the engine is idling. There have been a number of patents issued showing various combinations for reducing the hazard.

U.S. Pat. No. 3,228,177 to Coates shows a rotary mower having a hand control on the handle which must be held in an operative position by the operator while the mower is in use, this control releasing a brake band which is normally held in applied position by a tension spring. When the brake is held OFF, the engine and blade can rotate, but when the hand control is released, the brake is applied by a spring to the shaft, and an electrical contact cooperating with the brake mechanism short-circuits the ignition of the engine. Thus, the engine must be restarted each time the hand control is released by the operator.

U.S. Pat. No. 3,253,391 to Meldahl, U.S. Pat. No. 4,035,994 to Hoff and U.S. Pat. No. 4,044,533 to Wick all show the combination of a centrifugal clutch and a cooperating brake mechanism, whereby when the engine is at idle speed the clutch is disengaged and the brake is applied, thereby dis-engaging the cutter blade from the engine shaft and applying a brake to a member carrying the cutter blade so that it stops rotating. The patents to Meldahl and to Hoff show interconnected throttle and brake mechanisms whereby the throttle and the brake are operated in unison when a manual control is released.

The present invention is of the same general type, combining a brake, a throttle, and a decoupling clutch all of which operate in unison to stop the blade as soon as a manual control is released, without at the same time requiring complete stopping of the engine incident to such release.

THE INVENTION

This invention is applied to an ordinary rotary lawnmower of the type having a blade housing with an engine mounted on the housing and having a drive shaft extending through the housing, the housing being supported for movement over the ground on wheels. The housing carries a handle which extends therefrom in the manner well known per se and has a manual control lever which must be held in an operative position during cutting and which returns to an inoperative position automatically. The shaft carries a centrifugal expanding clutch shoe assembly which operates upon the inner periphery of the drum, which is journaled to the shaft and which carries the cutter blade at its lower end.

The invention includes a brake caliper assembly having two legs which are pivoted together and include paired inner legs surrounding the drum and paired outer legs attached thereto and extending away from the drum. The legs are pivoted together in non-crossing relationship, and their pivot is supported by the housing. A helical spring is compressed between the outer legs, and the force of the spring normally applies the brake to the drum. A control linkage, in the form of a Bowden wire cable is also coupled between the outer legs, and is connected to the manual control lever so that when the latter is held in the operative position, the outer legs are pulled toward each other against the force of the spring, thereby releasing the brake by retracting the inner legs from the drum. Linkage means also connects between the control lever and the throttle of the engine so that when the brake is released, the throttle is advanced from idle so that the centrifugal clutch shoes engage the drum and drive the cutter blade. The clutch and brake assembly further includes annular upper and lower rings which surround it and which protect these assemblies against the entry of dirt during operation of the mower. An electrical contact is attached in insulated relationship to one of the brake caliper legs and positioned such that it contacts the other leg when the brake shoes carried by the inner paired legs are worn to a serious degree. This contact is connected to the engine ignition system so as to kill the engine when the brake shoes are worn to a dangerous degree. The manual control lever comprises a pinch bar which extends horizontally across a cross bar of the handle of the mower. The pinch bar must be squeezed toward the handle cross bar in order to advance the throttle and release the brake, but when the pinch bar is released the spring which operates the brake provides force through the control linkage to return the pinch bar to an inoperative position in which the engine throttle is returned to idle and the brake is reapplied to the clutch drum.

It is a principle object of this invention to provide an improved safety control for lawnmowers which will meet the standards published by the U.S. Consumer Safety Commission on Jan. 15, 1979, and to provide a control which will meet these standards in an efficient and economical way using parts designed to provide reliable operation.

It is another major object of the invention to provide a new and improved brake system in the form of a caliper having legs which are pivoted together and which are applied to the external surface of the centrifugal clutch drum, rather than to the engine shaft, whereby the rotary cutter blade can be stopped well within the three second limit specified by the Safety Commission, the brake being normally applied by a spring which is attached in the compression mode between two arms of the brake caliper, rather than by a tension spring which tends to wear out and break more readily at its terminals.

Still a further object of the invention is to provide improved means for excluding dust and debris from the clutch and brake mechanism by using upper and lower annular dust rings which cover the brake and clutch assembly and which rotate when the cutter is in operation, thereby tending to centrifugally fling foreign particles away from the clutch and brake mechanism.

Another important object of the invention is to provide on the brake caliper mechanism electrical contacts suitably placed for sensing excessive wear of the brake shoes, and for short-circuiting the ignition system of the engine when such wear occurs.

Yet a further object of the invention is to provide a clutch assembly in which the portion of the clutch which supports the rotary blade is journaled on the other portion of the clutch which is keyed to the engine shaft along a relatively long sleeve-like engagement which is designed to prevent wobble between the two clutch members as a result of wear of the clutch mechanism over long periods of use.

A further object of the invention is to provide a pinch bar for the control lever which extends all the way across the handle of the lawnmower so that it can be conveniently held in pinched position by either the right hand or the left hand of the operator, thereby permitting the operator to avoid fatigue by changing hands periodically.

Other objects and advantages of the invention will become apparent during the following discussion of the drawings, wherein like parts have received like reference numerals in the various figures.

THE DRAWINGS

Figure 1:
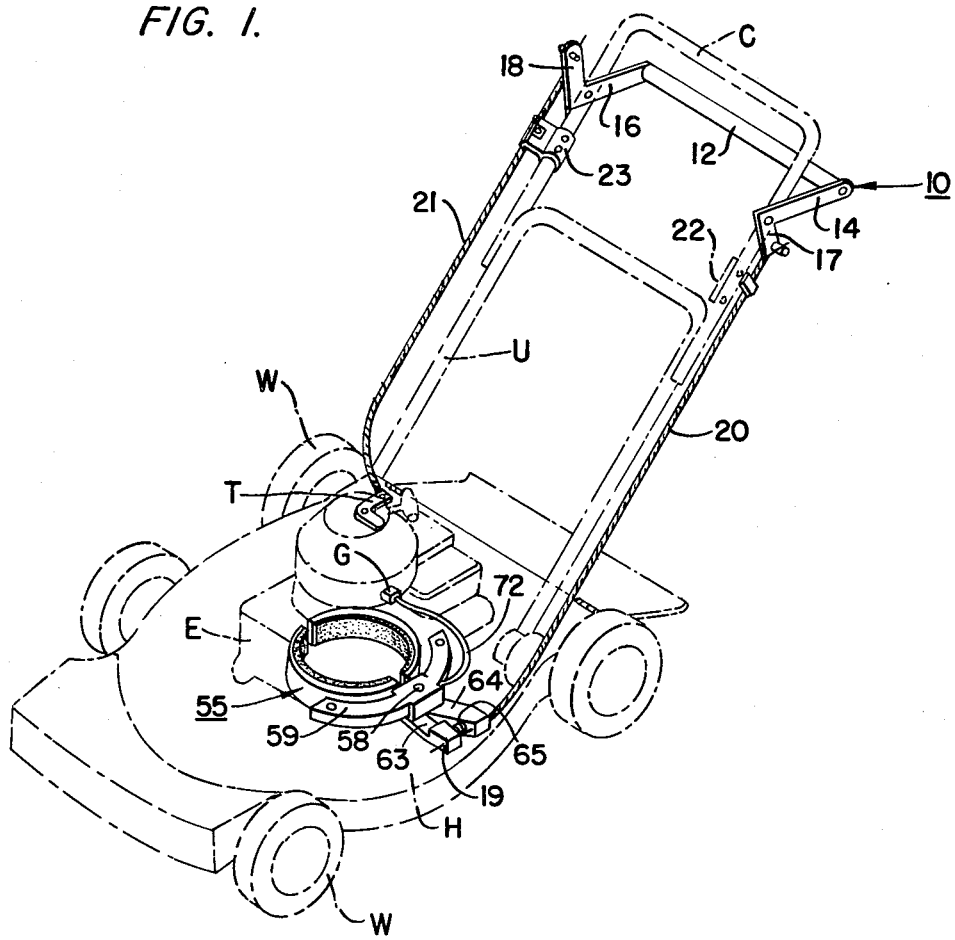
FIG. 1 is a partial perspective view showing the parts of a prior art type of rotary lawnmower in phantom lines, and showing part of the blade and engine control system in solid lines.

Referring now to the illustrative embodiment shown in FIG. 1, the outlines of a well known type of lawnmower are shown in phantom lines, illustrating a housing H riding on wheels W and having an engine E. The engine includes a throttle control arm T and an ignition shorting terminal G. The lawnmower has an upright handle U having a cross bar C at its upper end. FIG. 1 further shows a manual control lever assembly 10 having a pinch bar 12 and two arms 14 and 16 which are pivoted to the upright handle U. The arms have control levers 17 and 18 which are in turn connected with control linkage means, in this embodiment comprising flexible cables 20 and 21 whose upper ends are supported by brackets 22 and 23 attached to the handle. The cable 21 extends down to control the throttle T of the motor. As shown in FIG. 1, the pinch bar is in released position wherein the motor throttle is set for idle. The operating position for the control lever means 10 is achieved when the pinch bar 12 is pinched toward the cross bar C, in which position the throttle T is advanced by the linkage cable 21. The linkage cable 20 is connected to the control lever 17 and in the idle position as shown in FIG. 1, the core 19 of the cable 20 is in the elongated position at the caliper brake, thereby permitting the force of a spring 65 to apply the brake in a manner to be hereinafter explained, whereas when the pinch bar 12 is pinched upwardly toward the cross bar C, the brake becomes released, the throttle being advanced in this position.

Figure 2:
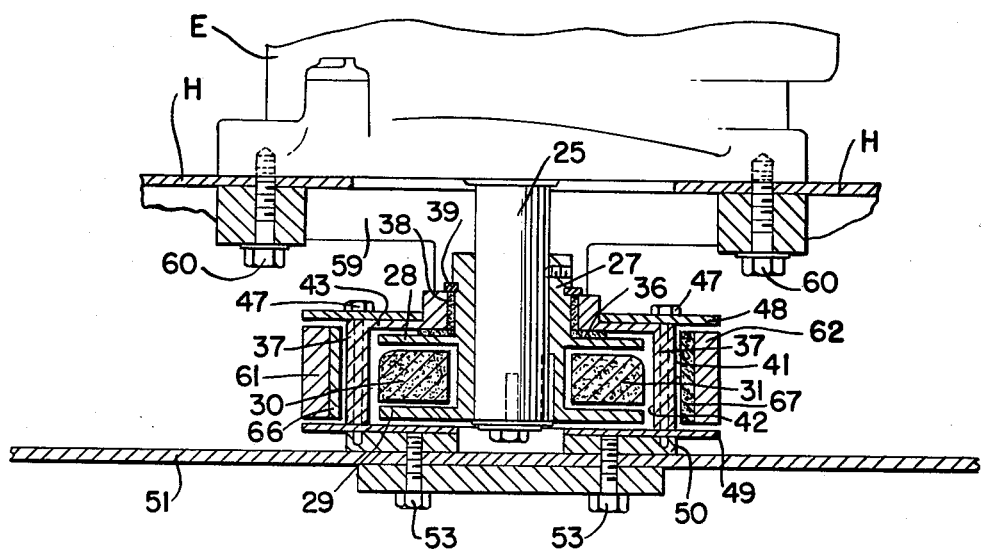
FIG. 2 is a fragmentary cross-sectional view taken in a vertical plane through the shaft of the mower and showing the clutch, brake, and cutter bar assembly in cross-section.
Figure 4:
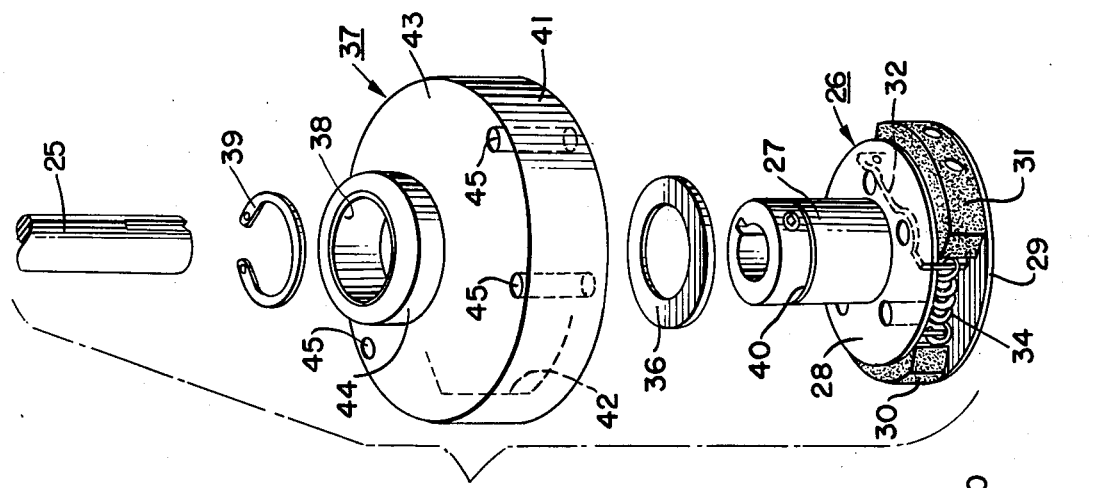
FIG. 4 is an enlarged exploded view of the clutch assembly.
Figure 3:
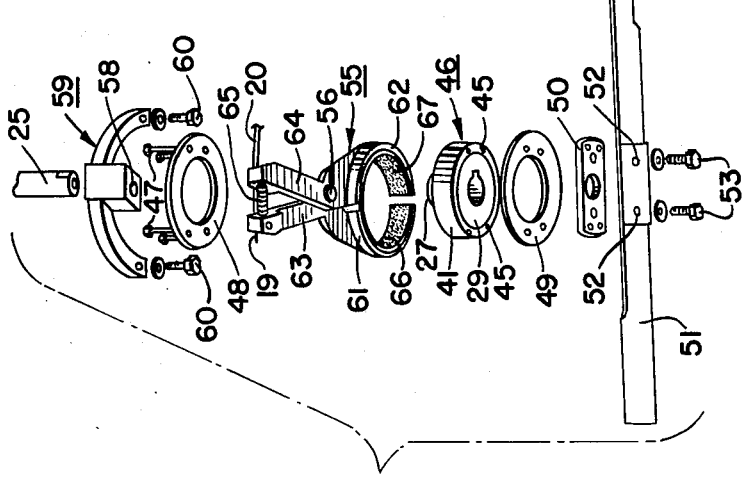
FIG. 3 is an exploded view showing the clutch, brake, and cutter bar assembly parts.

As can be seen in FIGS. 2, 3, and 4, the engine shaft 25 extends downwardly into the housing H and is keyed to a portion of a centrifugal clutch 46, FIGS. 3 and 4, this portion comprising the expanding shoe assembly 26 as can be best seen near the bottom of FIG. 4. The expanding shoe assembly 26 of the clutch comprises a hub 27 keyed onto the shaft 25, and the hub includes an upper plate 28 and a lower plate 29 between which are located the centrifugal clutch shoes 30 and 31 which in turn are supported on carrier plate 32 and 33, FIG. 4, which are pivotally supported between the upper and lower plates 28 and 29 and are provided with springs which pull the clutch shoes inwardly and oppose the tendency of centrifugal force to expand the shoes 30 and 31 outwardly, all in a manner well known per se in the prior art.

A thrust bushing 36 lies against the upper plate 28 and surrounds the hub, and supports the weight of the drum 37 which carries an oilite bearing sleeve 38 in its hub which surrounds the hub 27. A snap ring 39 prevents the drum member from riding upwardly on the hub 27 and fits in the groove 40 on the hub 27. The cross-section of the drum can best be seen in FIG. 2, the drum comprising an external peripheral surface 41, an internal peripheral surface 42, and a web 43 supporting the external periphery of the drum on the central hub portion 44 thereof. The drum also has four mounting holes of which the holes 45 are typical, and whose purpose will be hereinafter stated. The drum is a free fit over the assembly 26 of the expanding clutch shoes, and is freely rotatable on the bearing inserts 36 and 38 when the clutch shoes 30 and 31 are in fully retracted position.

The assembly shown in FIG. 4 comprises the clutch assembly 46 as shown in FIG. 3. As can best be shown in FIGS. 2 and 3, the holes 45 in the drum 37 receive four bolts 47 which pass through an upper dust ring 48, and extend downwardly through the holes 45 in the drum 37, and pass through a lower dust ring 49, and are tapped into a spacer plate 50 having four tapped holes to receive the ends of the bolts 47 to secure the dust rings, the drum, and the spacer plates together as shown in FIG. 2. These bolts 47 hold the spacer plate tightly against the bottom of the clutch drum 37. The cutter bar 51 has two clearance holes 52 extending therethrough, and these holes line up with two additional tapped holes in the spacer plate 50. The bolts 53 attach the cutter bar 51 to the spacer plate 50, again as shown in FIG. 2. The parts thus described in FIGS. 2 and 3 all are hung from the shaft 25 and rotate thereon.

The brake caliper assembly 55 is best seen in FIGS. 1, 2, 3 and 5, and comprises two leg members which are pivotally joined at a pivot bolt 56 which passes through a hole 57 in the paired legs. The bolt extends upwardly into a tapped hole 58 in a bracket 59 which is bolted through the housing H and to the engine casting as shown in FIG. 2 using bolts 60. The function of the bracket 59 is to support the brake caliper assembly 55 so that the pivoted legs of the brake caliper assembly are free to pivot around the center of the holes 57 and 58. The brake caliper assembly comprises two opposed inner legs 61 and 62 and corresponding outer legs 63 and 64 arranged in non-crossing relationship at the stationary pivot bolt 56 so that when the compression spring 65 pushes the outer legs 63 and 64 further apart, the inner legs 61 and 62 clamp more tightly together, thus applying the brake shoes 66 and 67 to the external peripheral surface 41 of the drum 37. Normally, the spring 65 holds the brake shoes 66 and 67 in tight engagement with the external surface 41, and it is only when the inner core member 19 of the control cable 20 is retracted, that the spring 65 is further compressed to thereby separate the inner legs 61 and 62 and release the brake shoes 66 and 67 from the external surface 41 of the drum 37. The release of the brake assembly from the external surface 41 occurs when the pinch bar 12 is pinched towards the cross bar C, thereby causing the lever 17 to pull the core 19 of the cable 20 in a direction to squeeze the outer legs 63 and 64 closer together and further separate the inner legs.

Figure 5:
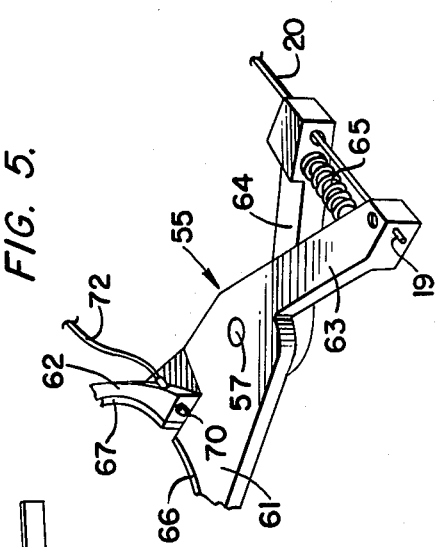
FIG. 5 is a fragmentary perspective view showing the arms of the brake caliper and the contact means by which the engine ignition is short-circuited when the brake shoes become worn.

FIG. 5 shows electrical contact means carried by the inner leg 62 of the brake caliper assembly 55. The electrical contact 70 extends from the inner leg 62 toward the inner leg 61, but normally short of it. As long as there is plenty of brake shoe thickness, the contact 70 which is mounted in insulated relationship with respect to the inner leg 62 will fail to touch the opposing inner leg 61. However when the brake shoes 66 and 67 are severely worn so that the brake mechanism is in danger of becoming inoperative the contact 70 will touch the inner leg 61, thereby grounding the wire 72 which is connected to the ignition terminal G as shown in FIG. 1, whereby the ignition of the engine is short-circuited whenever the pinch bar 12 is released by the operator, thereby making the lawnmower difficult although not impossible, to use until the brake shoes have been renewed.

The operation of the control system is as follows. Initially, the pinch bar 12 is in its released position as shown in FIG. 1. In this position, the throttle T is at idle, the centrifugal clutch disengaged, and the caliper brake assembly 55 is clamped tightly to the external surface 41 of the clutch drum 37, thereby preventing rotation of the cutter bar 51. When the operator wishes to proceed to cut the grass, he must manually squeeze the pinch bar 12 towards the cross bar C whereby the cable 20 has its core pulled toward the handle of the machine, thereby squeezing the outer legs 63 and 64 together and further compressing the spring 65, whereupon the inner legs 61 and 62 of the brake caliper assembly 55 are released from clamping position, allowing the drum 37 to rotate freely, carrying the cutter blade with it. At the same time, the cable 21 advances the throttle T, whereupon the engine increases its rpm from idle to a sufficient level that the clutch shoes 30 and 31 are expanded outwardly against the internal surface 42 of the clutch drum 37, thereby engaging the clutch and causing the cutter bar 51 which is attached to the drum 37 to rotate. If the operator releases his grip on the pinch bar 12, allowing it to move downwardly from the cross bar C and into the position shown in FIG. 1, the throttle is returned to idle and the caliper brake assembly is freed by the cable 20 so that the spring 65 will separate the outer legs 63 and 64 thereby reapplying the brakes to the drum 37 and stopping its rotation, the clutch shoes 30 and 31 having disengaged from the internal drum surface 42 under the action of the retracting springs 33.

The ignition of the engine will be short-circuited only when the brake shoes 66 and 67 have become so worn that the contact 70 touches the inner legs 61 and thereby shorts out the ignition terminal G of the engine E.

This invention is not to be limited to the exact form shown in the drawings, for obviously changes may be made therein within the scope of the following claims.

I claim:

1. In a lawnmower having a blade housing, a shaft extending into the housing, an engine mounted on the housing and driving the shaft and having a throttle, means supporting the housing for movement over the ground, and a handle carried by the housing and extending therefrom for manual manipulation by an operator, an improved control system to control the rotation of a cutter blade comprising:

(a) centrifugally expanding clutch shoe means mounted on the shaft inside the housing;
    (b) a drum surrounding the clutch shoe means and supported to freely rotate with respect thereto, and having an internal surface engageable by the shoe means when expanded, and having an external surface;
    (c) a cutter blade fixed to the drum below the expanding clutch shoe means;
    (d) a brake caliper assembly having paired inner and outer legs coupled together at a pivot and the assembly being supported by the housing at the pivot, the inner paired legs carrying brake shoes located adjacent to the external surface of the drum, and the caliper assembly including spring means connected between the outer paired legs and yieldably biasing them to pivot in a direction to apply the brake shoes of the inner legs against said external surface of the drum;
    (e) manual control lever means carried by the handle; and
    (f) linkage means coupling the control lever means with said engine throttle and with said outer paired legs, and operative such that when the control lever means is manually moved to overcome the bias of the spring means on the legs to retract the brake shoes from said external surface, the throttle is advanced beyond idle, and when the control lever means is released the brake shoes are applied by the spring means and the throttle is returned to idle.

2. In a lawnmower system as set forth in claim 1, said centrifugally expanding clutch shoe means comprising a hub fixed to the shaft and having radially extending upper and lower plates; and clutch shoe and carrier means pivotally secured between said plates and biased to oppose centrifugal expansion, said drum surrounding said plates and being journaled for free rotation on said hub.

3. In a lawnmower system as set forth in claim 2, upper and lower annular dust rings fixed to said drum, the upper dust ring overlying the upper plate of the clutch means and the lower dust ring underlying the lower plate of the clutch means, and both dust rings extending outwardly beyond said external surface of the drum and enclosing between them the inner arms of the brake assembly.

4. In a lawnmower system as set forth in claim 1, the paired legs of said caliper assembly forming an X-shaped configuration comprising two non-crossing leg members each having an inner leg and an outer leg, the paired inner legs supporting the brake shoes and being curved to follow the contour of the drum; and said spring means comprising a compression spring compressed between the paired outer legs.

5. In a lawnmower system as set forth in claim 1, said handle having a cross bar and said control lever means comprising a pinch bar pivotally supported on the handle and adapted to be pinched toward the cross bar by the operator, and said linkage means comprising flexible control cables coupled between the control lever means and the throttle and the outer paired legs and operative when the pinch bar is pinched toward the cross bar to advance the throttle and to displace the outer legs toward each other against the bias of the spring means.

6. In a lawnmower system as set forth in claim 1 wherein the engine has an ignition system; electrical contact means carried by the paired arms of the brake caliper assembly and coupled to the engine ignition system, the contact means being located on the paired arms such that when the brake shoes become worn, the contact means will close to short-circuit the engine ignition system.

* * * * *